United States Patent
Walster et al.

(10) Patent No.: US 6,823,352 B2
(45) Date of Patent: *Nov. 23, 2004

(54) SOLVING A NONLINEAR EQUATION THROUGH INTERVAL ARITHMETIC AND TERM CONSISTENCY

(75) Inventors: G. William Walster, Cupertino, CA (US); Eldon R. Hansen, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 553 days.

This patent is subject to a terminal disclaimer.

(21) Appl. No.: 09/952,759

(22) Filed: Sep. 13, 2001

(65) Prior Publication Data

US 2003/0050947 A1 Mar. 13, 2003

(51) Int. Cl.[7] .................................................. G06F 7/38
(52) U.S. Cl. ........................................................ 708/446
(58) Field of Search ......................................... 708/446

(56) References Cited

U.S. PATENT DOCUMENTS

| | | | | |
|---|---|---|---|---|
| 5,008,672 A | * | 4/1991 | Leedy | 341/138 |
| 5,014,230 A | * | 5/1991 | Sinha et al. | 703/2 |
| 6,560,623 B1 | * | 5/2003 | Smith | 708/551 |

OTHER PUBLICATIONS

E.R. Hansen, "Global Optimization Using Interval Analysis," Marcel Dekker, Inc., New York, NY, 1992.

R.B. Kearfott, "A Fortran 90 Environment for Research and Prototyping of Enclosure Algorithms for Nonlinear Equations and Global Optimization," ACM Transactions on Mathematical Software, vol. 21, No. 1, Mar. 1995, pp. 63–78 http://interval. louisiana.edu/preprints.html.

R. B. Kearfott, Algorithm 763: Interval Arithmetic: A Fortran 90 Module for an Interval Data Type, ACM Trans. Math. Software, 22, vol. 4, 1996, pp. 385–392. http://interval.louisiana.edu/preprints.html.

R. B. Kearfott and M. Novoa III, "Algorithm 681: INTBIS, A portable interval Newton/bisection package", ACM Trans, Math Software, vol. 16, No. 2, pp. 152–147. http://www.netlib.org/toms/681.

R. B. Kearfott, M. Dawande, K.S. Du, and C. Hu, "Algorithm 737: INTLIB: A Portable Fortran 737 Interval Standard Function Library," ACM Trans. Math. Software, 20, vol. 4, Dec. 1994, pp. 447–458.

R. B. Kearfott and G. W. Waister, "On Stopping Criteria in Verified Nonlinear Systems or Optimization Algorithms," ACM Trans. Math. Software, 26, vol. 3, Sep. 2000, pp. 323–351. The publication itself says Received: Jul. 1999; revised: Mar. 2000; accepted: Mar. 2000. http://interval.louisiana.edu/preprints.html.

(List continued on next page.)

Primary Examiner—Chuong Dinh Ngo
(74) Attorney, Agent, or Firm—Park, Vaughan & Fleming, LLP

(57) ABSTRACT

One embodiment of the present invention provides a system for solving a nonlinear equation through interval arithmetic. During operation, the system receives a representation of the nonlinear equation $f(x)=0$, as well as a representation of an initial interval, X, wherein this representation of X includes a first floating-point number, $X_L$, for the left endpoint of X, and a second floating-point number, $X_U$, for the right endpoint of X. Next, the system symbolically manipulates the nonlinear equation $f(x)=0$ to solve for a first term, $g_1(x)$, thereby producing a modified equation $g_1(x)=h_1(x)$, wherein the first term $g_1(x)$ can be analytically inverted to produce an inverse function $g_1^{-1}(x)$. The system then plugs the initial interval X into the modified equation to produce the equation $g_1(X')=h_1(X)$, and solves for $X'=g_1^{-1}[h_1(X)]$. Next, the system intersects X' with the initial interval X to produce a new interval $X^+$, wherein the new interval $X^+$ contains all solutions of the equation $f(x)=0$ within the initial interval X, and wherein the size of the new interval $X^+$ is less than or equal to the size of the initial interval X.

7 Claims, 4 Drawing Sheets

OTHER PUBLICATIONS

R.E. Moore and S.T. Jones "Safe Starting Regions for Iterative Methods", SIAM Journal on Numerical Analysis, vol. 14, No. 6 (Dec. 1977), pp. 1051–1065.

A. Neumaier, "The Enclosure of Solutions of ParameterDependent Systems of Euqations," Cambridge University Press, Cambridge, 1990, ISBN: 0–12–505630–3, Reliability in Computing pp. 269–286.

S.M. Rump, "Verification Methods for Dense and Sparse Systems of Equations," in Topics in Validated Computations: Proceedings of the IMACS–GAMM International Workshop on Validated Computations, University of Oldenburg, J. Herzberger, ed., Elsevier Studies in Computational Mathematics, Elsevier, 1994, pp. 63–136.

* cited by examiner $X \equiv [\underline{x}, \bar{x}] \equiv \{x \in \Re^* | \underline{x} \leq x \leq \bar{x}\}$ $Y \equiv [\underline{y}, \bar{y}] \equiv \{y \in \Re^* | \underline{y} \leq y \leq \bar{y}\}$ (1) $X + Y = [\downarrow \underline{x} + \underline{y}, \uparrow \bar{x} + \bar{y}]$ (2) $X - Y = [\downarrow \underline{x} - \bar{y}, \uparrow \bar{x} - \underline{y}]$ (3) $X \times Y = [\min(\downarrow \underline{x} \times \underline{y}, \underline{x} \times \bar{y}, \bar{x} \times \underline{y}, \bar{x} \times \bar{y}), \max(\uparrow \underline{x} \times \underline{y}, \underline{x} \times \bar{y}, \bar{x} \times \underline{y}, \bar{x} \times \bar{y})]$ (4) $X/Y = [\min(\downarrow \underline{x}/\underline{y}, \underline{x}/\bar{y}, \bar{x}/\underline{y}, \bar{x}/\bar{y}), \max(\uparrow \underline{x}/\underline{y}, \underline{x}/\bar{y}, \bar{x}/\underline{y}, \bar{x}/\bar{y})]$, if $0 \notin Y$ $X/Y \subseteq \Re^*$, if $0 \in Y$

FIG. 5

SOLVING A NONLINEAR EQUATION THROUGH INTERVAL ARITHMETIC AND TERM CONSISTENCY

BACKGROUND

1. Field of the Invention

The present invention relates to performing arithmetic operations on interval operands within a computer system. More specifically, the present invention relates to a method and an apparatus for using a computer system to solve a nonlinear equation through interval arithmetic and term consistency.

2. Related Art

Rapid advances in computing technology make it possible to perform trillions of computational operations each second. This tremendous computational speed makes it practical to perform computationally intensive tasks as diverse as predicting the weather and optimizing the design of an aircraft engine. Such computational tasks are typically performed using machine-representable floating-point numbers to approximate values of real numbers. (For example, see the Institute of Electrical and Electronics Engineers (IEEE) standard 754 for binary floating-point numbers.)

In spite of their limitations, floating-point numbers are generally used to perform most computational tasks.

One limitation is that machine-representable floating-point numbers have a fixed-size word length, which limits their accuracy. Note that a floating-point number is typically encoded using a 32, 64 or 128-bit binary number, which means that there are only $2^{32}$, $2^{64}$ or $2^{128}$ possible symbols that can be used to specify a floating-point number. Hence, most real number values can only be approximated with a corresponding floating-point number. This creates estimation errors that can be magnified through even a few computations, thereby adversely affecting the accuracy of a computation.

A related limitation is that floating-point numbers contain no information about their accuracy. Most measured data values include some amount of error that arises from the measurement process itself. This error can often be quantified as an accuracy parameter, which can subsequently be used to determine the accuracy of a computation. However, floating-point numbers are not designed to keep track of accuracy information, whether from input data measurement errors or machine rounding errors. Hence, it is not possible to determine the accuracy of a computation by merely examining the floating-point number that results from the computation.

Interval arithmetic has been developed to solve the above-described problems. Interval arithmetic represents numbers as intervals specified by a first (left) endpoint and a second (right) endpoint. For example, the interval [a, b], where a<b, is a closed, bounded subset of the real numbers, R, which includes a and b as well as all real numbers between a and b. Arithmetic operations on interval operands (interval arithmetic) are defined so that interval results always contain the entire set of possible values. The result is a mathematical system for rigorously bounding numerical errors from all sources, including measurement data errors, machine rounding errors and their interactions. (Note that the first endpoint normally contains the "infimum", which is the largest number that is less than or equal to each of a given set of real numbers. Similarly, the second endpoint normally contains the "supremum", which is the smallest number that is greater than or equal to each of the given set of real numbers.)

One commonly performed computational operation is to find the roots of a nonlinear equation. This can be accomplished using Newton's method. The interval version of Newton's method works in the following manner. From the mean value theorem, $$f(x)-f(x^*)=(x-x^*)f'(\xi),$$

where $\xi$ is some generally unknown point between x and $x^*$. If $x^*$ is a zero of f, then $f(x^*)=0$ and, from the previous equation, $$x^*=x-f(x)/f'(\xi).$$

Let X be an interval containing both x and $x^*$. Since $\xi$ is between x and $x^*$, it follows that $\xi \in X$. Moreover, from basic properties of interval analysis it follows that $f'(\xi) \in f'(X)$. Hence, $x^* \in N(x,X)$ where $$N(x,X)=x-f(x)/f'(X).$$

Temporarily assume $0 \notin f'(X)$ so that $N(x,X)$ is a finite interval. Since any zero of f in X is also in $N(x,X)$, the zero is in the intersection $X \cap N(x,X)$. Using this fact, we define an algorithm for finding zero $x^*$. Let $X_0$ be an interval containing $x^*$. For $n=0, 1, 2, \ldots$, define $$x_n=m(X_n)$$

$$N(x_n,X_n)=x_n-f(x_n)/f'(X_n)$$

$$X_{n+1}=X_n \cap N(x_n,X_n),$$

wherein $m(X)$ is the midpoint of the interval X. We call $x_n$ the point of expansion for the Newton method. It is not necessary to choose $x_n$ to be the midpoint of $X_n$. The only requirement is that $x_n \in X_n$ to assure that $x^* \in N(x_n,X_n)$. However, it is convenient and efficient to choose $x_n=m(X_n)$. Note that the roots of an interval equation can be intervals rather than points when the equation contains non-degenerate interval constants or parameters.

One problem in using the interval version of Newton's method is that performing each interval Newton step requires a large number of computational operations. Furthermore, the interval version of Newton's method typically does not converge rapidly when the initial interval $X_0$ is wide.

What is needed is a method and an apparatus that efficiently finds the roots of a nonlinear equation without the above-described problems of using Newton's method.

SUMMARY

One embodiment of the present invention provides a system for solving a nonlinear equation through interval arithmetic. During operation, the system receives a representation of the nonlinear equation $f(x)=0$, as well as a representation of an initial interval, X, wherein this representation of X includes a first floating-point number, $X_L$, for the left endpoint of X and a second floating-point number, $X_U$, for the right endpoint of X. Next, the system symbolically manipulates the nonlinear equation $f(x)=0$ to solve for a first term, $g_1(x)$, thereby producing a modified equation $g_1(x)=h_1(x)$, such that $g_1(x)-h_1(x)=0$ is analytically equivalent to $f(x)=0$, wherein the first term $g_1(x)$ can be analytically inverted to produce an inverse function $g_1^{-1}(x)$. The system then plugs the initial interval X into the modified equation to produce the equation $g_1(X')=h_1(X)$, and solves for $X'=g_1^{-1}[h_1(X)]$. Next, the system intersects X' with the initial interval X to produce a new interval $X^+$, wherein the new interval $X^+$ contains all solutions of the equation $f(x)=0$ within the initial interval X, and wherein the size of the new interval $X^+$ is less than or equal to the size of the initial interval X.

In one embodiment of the present invention, the system additionally sets $X=X^+$, and repeats the process of symbolically manipulating, plugging, solving and intersecting to produce a new interval $X^+$ for a second term $g_2(x)=h_2(x)$, wherein the second term $g_2(x)$ can be analytically inverted to produce an inverse function $g_2^{-1}$.

In one embodiment of the present invention, for each term, $g_1(x)$, that can be analytically inverted within the equation $f(x)=0$, the system sets $X=X^+$, and repeats the process of symbolically manipulating, plugging, solving and intersecting to produce a new interval $X^+$.

In one embodiment of the present invention, the system additionally performs an interval Newton step on the function $f(x)=0$ and the initial interval X to narrow the set of interval solutions to the equation $f(x)=0$.

In one embodiment of the present invention, symbolically manipulating the nonlinear equation $f(x)=0$ involves first selecting the invertible term, $g_1(x)$, as the term that dominates the function $f(x)=0$ within the interval X.

In one embodiment of the present invention, receiving the representation of the nonlinear equation $f(x)=0$ involves symbolically manipulating an inequality to produce the nonlinear equation $f(x)=0$.

In one embodiment of the present invention, the system is part of an optimization system.

BRIEF DESCRIPTION OF THE FIGURES

FIG. 5 illustrates four different interval operations in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
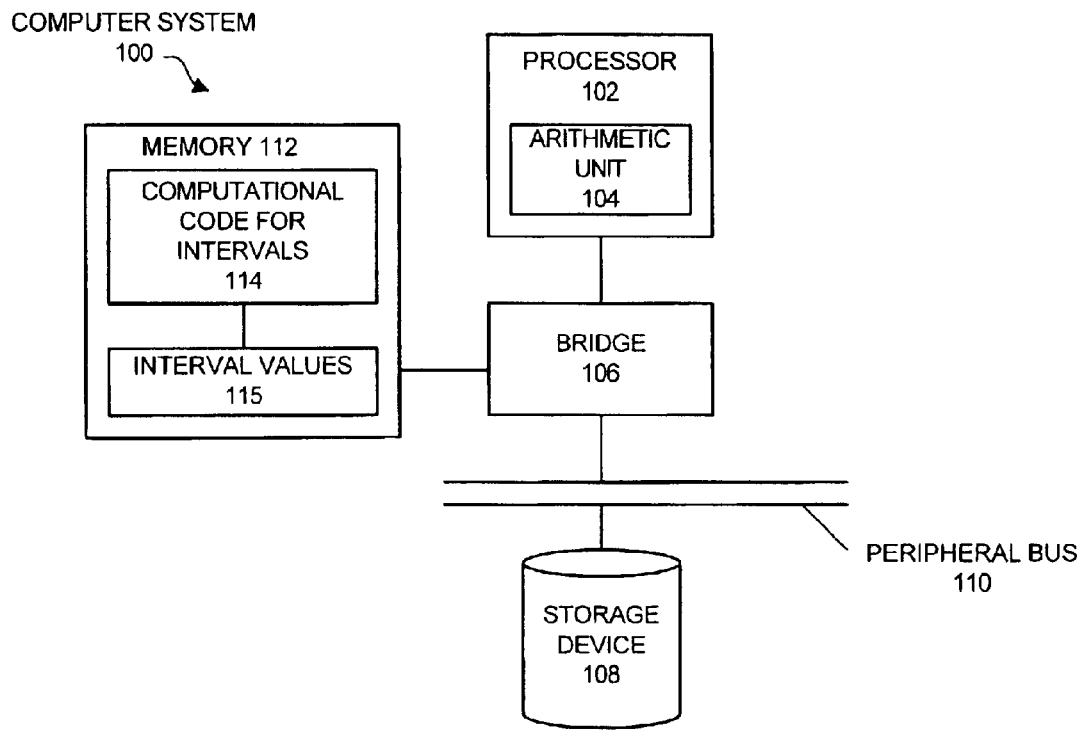
FIG. 1 illustrates a computer system in accordance with an embodiment of the present invention.

FIG. 1 illustrates a computer system 100 in accordance with an embodiment of the present invention. As illustrated in FIG. 1, computer system 100 includes processor 102, which is coupled to a memory 112 and a to peripheral bus 110 through bridge 106. Bridge 106 can generally include any type of circuitry for coupling components of computer system 100 together.

Processor 102 can include any type of processor, including, but not limited to, a microprocessor, a mainframe computer, a digital signal processor, a personal organizer, a device controller and a computational engine within an appliance. Processor 102 includes an arithmetic unit 104, which is capable of performing computational operations using floating-point numbers.

Processor 102 communicates with storage device 108 through bridge 106 and peripheral bus 110. Storage device 108 can include any type of non-volatile storage device that can be coupled to a computer system. This includes, but is not limited to, magnetic, optical, and magneto-optical storage devices, as well as storage devices based on flash memory and/or battery-backed up memory.

Processor 102 communicates with memory 112 through bridge 106. Memory 112 can include any type of memory that can store code and data for execution by processor 102. As illustrated in FIG. 1, memory 112 contains computational code for intervals 114. Computational code 114 contains instructions for the interval operations to be performed on individual operands, or interval values 115, which are also stored within memory 112. This computational code 114 and these interval values 115 are described in more detail below with reference to FIGS. 2–5.

Note that although the present invention is described in the context of computer system 100 illustrated in FIG. 1, the present invention can generally operate on any type of computing device that can perform computations involving floating-point numbers. Hence, the present invention is not limited to the computer system 100 illustrated in FIG. 1.

Compiling and Using Interval Code

Figure 2:
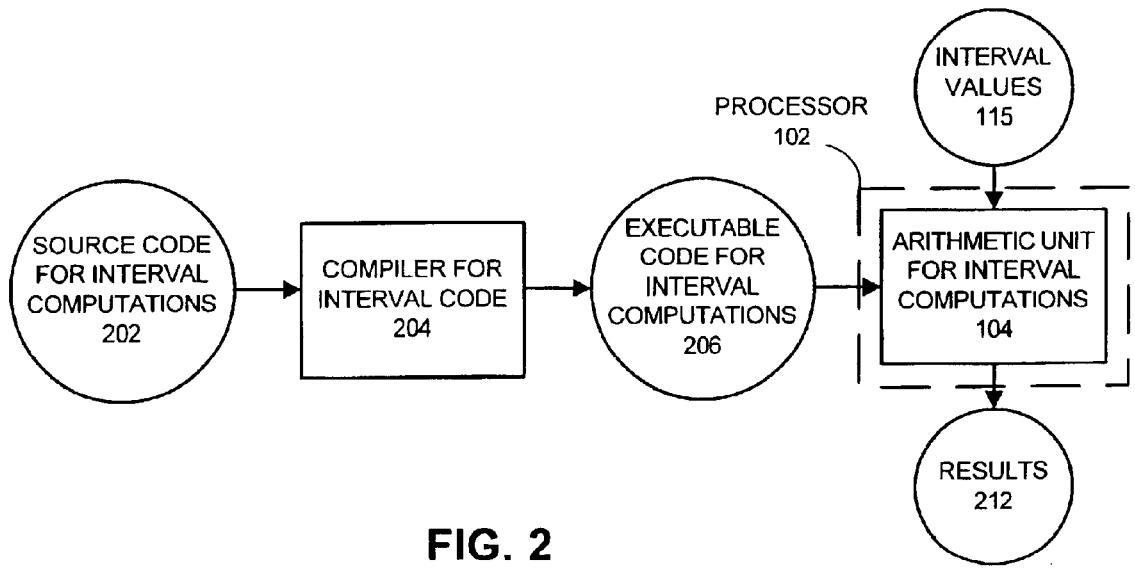
FIG. 2 illustrates the process of compiling and using code for interval computations in accordance with an embodiment of the present invention.

FIG. 2 illustrates the process of compiling and using code for interval computations in accordance with an embodiment of the present invention. The system starts with source code 202, which specifies a number of computational operations involving intervals. Source code 202 passes through compiler 204, which converts source code 202 into executable code form 206 for interval computations. Processor 102 retrieves executable code 206 and uses it to control the operation of arithmetic unit 104.

Processor 102 also retrieves interval values 115 from memory 112 and passes these interval values 115 through arithmetic unit 104 to produce results 212. Results 212 can also include interval values.

Note that the term "compilation" as used in this specification is to be construed broadly to include pre-compilation and just-in-time compilation, as well as use of an interpreter that interprets instructions at run-time. Hence, the term "compiler" as used in the specification and the claims refers to pre-compilers, just-in-time compilers and interpreters.

Arithmetic Unit for Intervals

Figure 3:
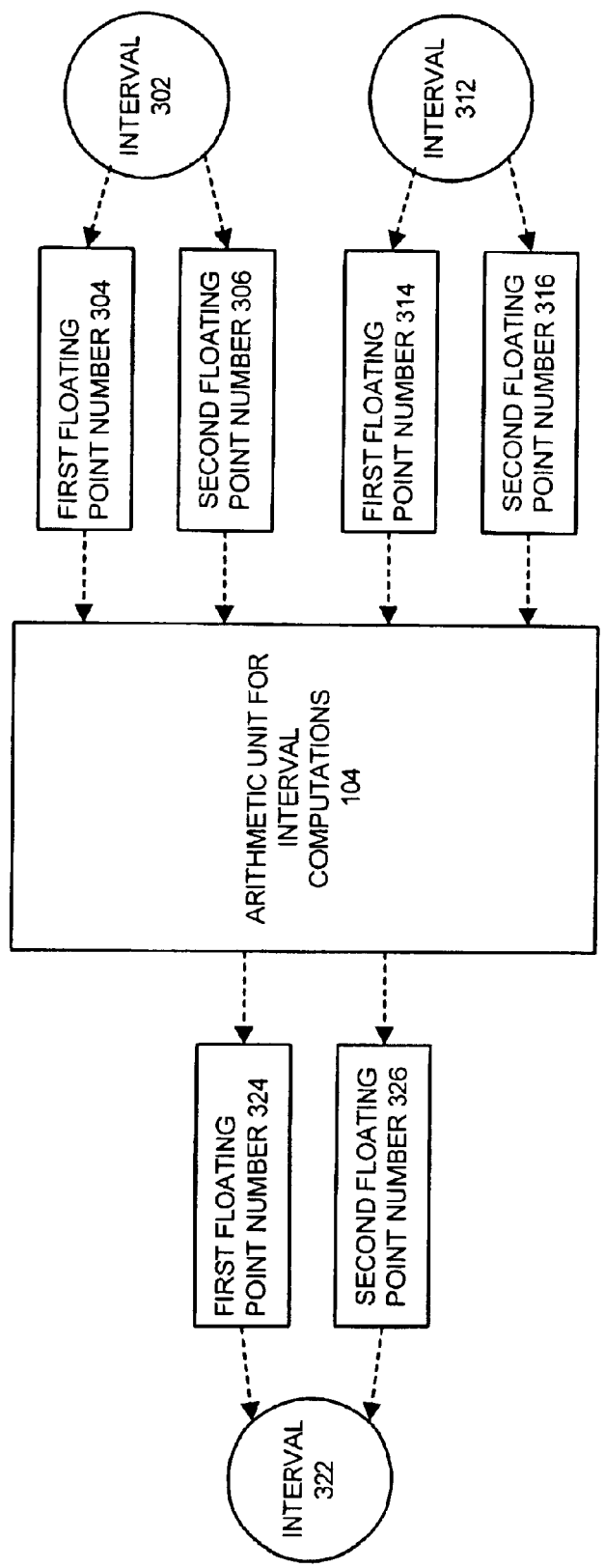
FIG. 3 illustrates an arithmetic unit for interval computations in accordance with an embodiment of the present invention.

FIG. 3 illustrates arithmetic unit 104 for interval computations in more detail accordance with an embodiment of the present invention. Details regarding the construction of such an arithmetic unit are well known in the art. For example, see U.S. Pat. Nos. 5,687,106 and 6,044,454, which are hereby incorporated by reference in order to provide details on the construction of such an arithmetic unit. Arithmetic unit 104 receives intervals 302 and 312 as inputs and produces interval 322 as an output.

In the embodiment illustrated in FIG. 3, interval 302 includes a first floating-point number 304 representing a first endpoint of interval 302, and a second floating-point number 306 representing a second endpoint of interval 302. Similarly, interval 312 includes a first floating-point number 314 representing a first endpoint of interval 312, and a second floating-point number 316 representing a second endpoint of interval 312. Also, the resulting interval 322 includes a first floating-point number 324 representing a first endpoint of interval 322, and a second floating-point number 326 representing a second endpoint of interval 322.

Note that arithmetic unit 104 includes circuitry for performing the interval operations that are outlined in FIG. 5. This circuitry enables the interval operations to be performed efficiently.

However, note that the present invention can also be applied to computing devices that do not include special-purpose hardware for performing interval operations. In such computing devices, compiler 204 converts interval operations into a executable code that can be executed using standard computational hardware that is not specially designed for interval operations.

Figure 4:
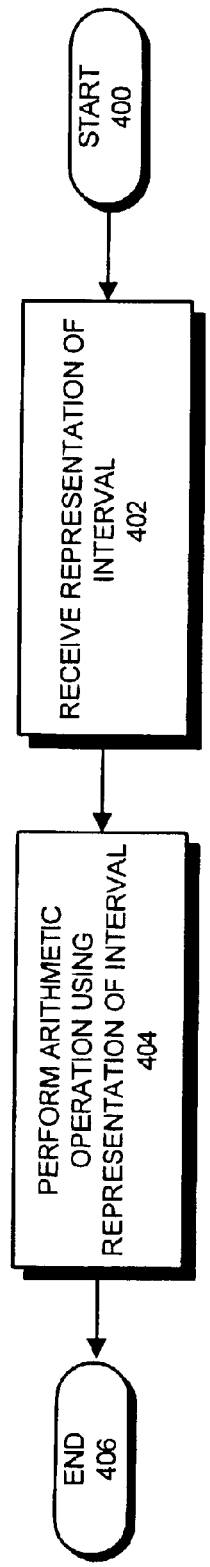
FIG. 4 is a flow chart illustrating the process of performing an interval computation in accordance with an embodiment of the present invention.

FIG. 4 is a flow chart illustrating the process of performing an interval computation in accordance with an embodiment of the present invention. The system starts by receiving a representation of an interval, such as first floating-point number 304 and second floating-point number 306 (step 402). Next, the system performs an arithmetic operation using the representation of the interval to produce a result (step 404). The possibilities for this arithmetic operation are described in more detail below with reference to FIG. 5.

Interval Operations

FIG. 5 illustrates four different interval operations in accordance with an embodiment of the present invention. These interval operations operate on the intervals X and Y. The interval X includes two endpoints, $\underline{x}$ denotes the lower bound of X, and $\overline{x}$ denotes the upper bound of X.

The interval X is a closed subset of the extended (including $-\infty$ and $+\infty$) real numbers R* (see line 1 of FIG. 5). Similarly the interval Y also has two endpoints and is a closed subset of the extended real numbers R* (see line 2 of FIG. 5).

Note that an interval is a point or degenerate interval if $X=[x, x]$. Also note that the left endpoint of an interior interval is always less than or equal to the right endpoint. The set of extended real numbers, R* is the set of real numbers, R, extended with the two ideal points negative infinity and positive infinity:

$R^* = R \cup \{-\infty\} \cup \{+\infty\}$.

In the equations that appear in FIG. 5, the up arrows and down arrows indicate the direction of rounding in the next and subsequent operations. Directed rounding (up or down) is applied if the result of a floating-point operation is not machine-representable.

The addition operation X+Y adds the left endpoint of X to the left endpoint of Y and if necessary rounds down to the nearest floating-point number to produce a resulting left endpoint, and adds the right endpoint of X to the right endpoint of Y and if necessary rounds up to the nearest floating-point number to produce a resulting right endpoint.

Similarly, the subtraction operation X−Y subtracts the right endpoint of Y from the left endpoint of X and if necessary rounds down to produce a resulting left endpoint, and subtracts the left endpoint of Y from the right endpoint of X and if necessary rounds up to produce a resulting right endpoint.

The multiplication operation selects the minimum value of four different terms (rounded down) to produce the resulting left endpoint. These terms are: the left endpoint of X multiplied by the left endpoint of Y; the left endpoint of X multiplied by the right endpoint of Y; the right endpoint of X multiplied by the left endpoint of Y; and the right endpoint of X multiplied by the right endpoint of Y. This multiplication operation additionally selects the maximum of the same four terms (rounded up) to produce the resulting right endpoint.

Similarly, the division operation selects the minimum of four different terms (rounded down) to produce the resulting left endpoint. These terms are: the left endpoint of X divided by the left endpoint of Y; the left endpoint of X divided by the right endpoint of Y; the right endpoint of X divided by the left endpoint of Y; and the right endpoint of X divided by the right endpoint of Y. This division operation additionally selects the maximum of the same four terms (rounded up) to produce the resulting right endpoint. For the special case where the interval Y includes zero, X/Y is an exterior interval that is nevertheless contained in the interval R*.

Note that the result of any of these interval operations is the empty interval if either of the intervals, X or Y, are the empty interval. Also note, that in one embodiment of the present invention, extended interval operations never cause undefined outcomes, which are referred to as "exceptions" in the IEEE 754 standard.

Term Consistency

Figure 6:
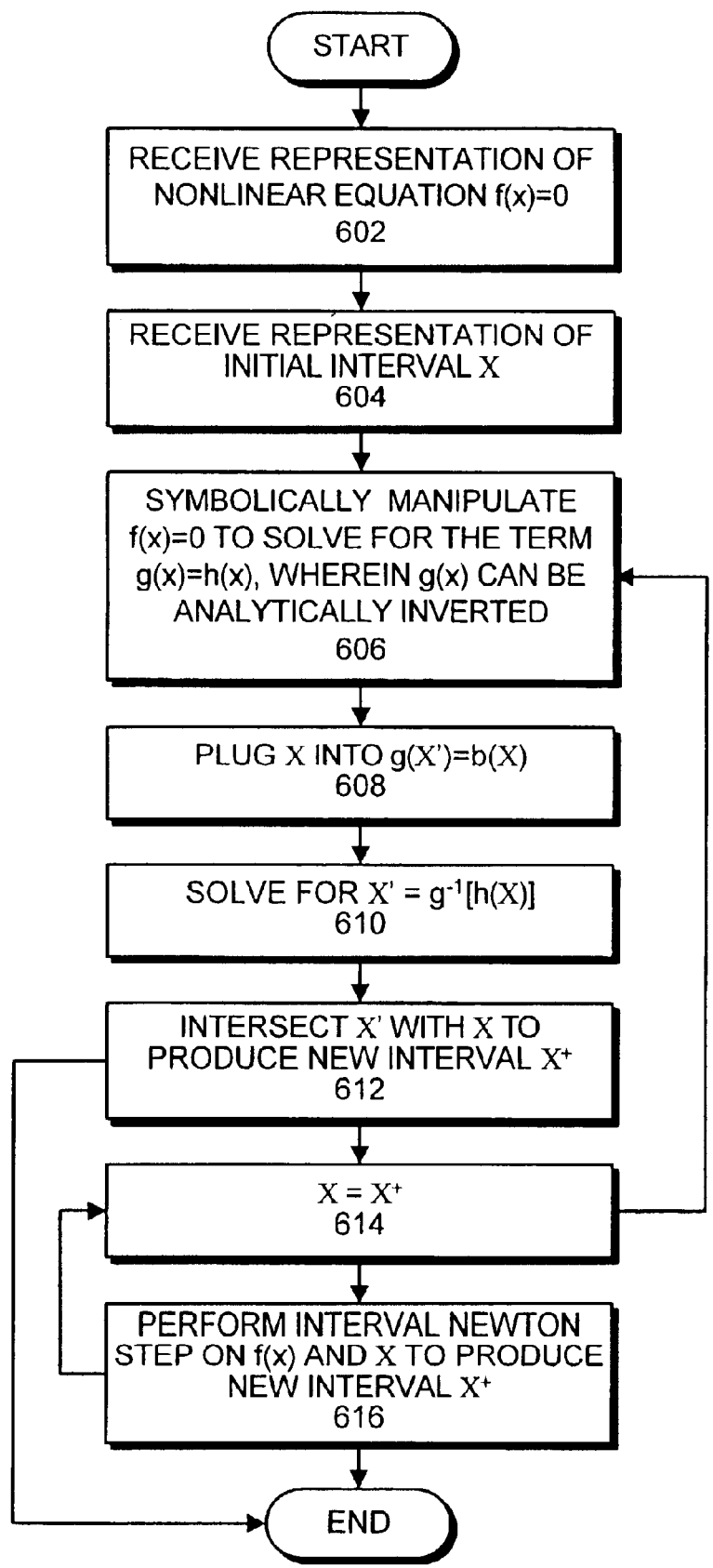
FIG. 6 is a flow chart illustrating the process of finding an interval solution to a nonlinear equation using term consistency in accordance with an embodiment of the present invention.

FIG. 6 is a flow chart illustrating the process of solving a nonlinear equation through interval arithmetic and term consistency in accordance with an embodiment of the present invention. The system starts by receiving a representation of a nonlinear equation $f(x)=0$ (step 602), as well as a representation of an initial interval X (step 604). Next, the system symbolically manipulates the equation $f(x)=0$ to solve for a term $g(x)=h(x)$, wherein the term $g(x)$ can be analytically inverted to produce and inverse function $g^{-1}$ (step 606).

Next, the system plugs the initial interval X into h(x) to produce the equation $g(X')=h(X)$ (step 608). The system then solves for $X'=g^{-1}[h(X)]$ (step 610). The resulting interval X' is then intersected with the initial interval X to produce a new interval $X^+$ (step 612).

At this point, the system can terminate. Otherwise, the system can perform further processing. This further processing involves setting $X=X^+$ (step 614) and then either returning to step 606 to for another iteration of term consistency on another term of $f(x)$, or by performing an interval Newton step on $f(x)$ and X to produce a new interval $X^+$ (step 616).

EXAMPLES

For example, suppose we seek a solution of $x^4+x-2=0$ in the interval $X=[-100,100]$. Solving for $X^4$ and replacing x in the remaining terms by the interval X, we obtain $(X')^4=2-$

[−100,100]=[−98,102]. Since $(X')^4$ must be non-negative, we replace this equation by $(X')^4=[0,102]$ and conclude that $X'=[−3.18, 3.18]$, approximately. This is a substantial reduction of the initial interval.

In another example, suppose $f(x)-x^2-x+6$ and we define $g(x)=x^2$ and $h(x)=x-6$. Let $X=[−10,10]$. The procedural step is $(X')^2=X-6=[−16,4]$. Since $(X')^2$ must be non-negative, we replace this interval by [0,4]. Solving for X', we obtain $X'=\pm[0,2]$. In replacing the range of h(x) (i.e., [−16,4]) by non-negative values, we have excluded that part of the range h(x) that is not in the domain of $g(x)=x^2$.

Suppose that we reverse the roles of g and h and use the iterative step $h(X')=g(X)$. That is $X'-6=X^2$. We obtain $X'=[6,106]$. Intersecting this result with the interval [−10,10], of interest, we obtain [6,10]. This interval excludes the set of values for which the range of g(X) is not in the intersection of the domain of h(X) with X.

Combining these results, we conclude that any solution of $g(X)-h(X)=0$ that occurs in $X=[−10,10]$ must be in both [−2,2] and [6,10]. Since these intervals are disjoint, there can be no solution in [−10,10].

In practice, if we already reduced the interval from [−10,10] to [−2,2] by solving for g, we use the narrower interval as input when solving for h.

This example illustrates the fact that it can be advantageous to solve a given equation for more than one of its terms. The order in which terms are chosen affects the efficiency. Unfortunately, it can be difficult to choose the best order.

Also note that there can be many choices for g(x). For example, suppose we use term consistency to narrow the interval bound X on a solution of $f(x)=ax^4+bx+c=0$. We can let $g(x)=bx$ and compute $X'=-(aX^4+c)/b$ or we can let $g(x)=ax^4$ and compute $X'=\pm[-(bX+c)/a]^{1/4}$. We can also separate $x^4$ into $x^2*x^2$ and solve for one of the factors $X'=\pm[-(bX+c)/(aX^2)]^{1/2}$.

In the multidimensional case, we may solve for a term involving more than one variable. We then have a two-stage process. For example, suppose we solve for the term $1/(x+y)$ from the function $f(x,y)=1/(x+y)-h(x,y)=0$. Let $x \in X=[1,2]$ and $y \in Y=[0.5,2]$. Suppose we find that $h(XY)=[0.5,1]$. Then $1/(x+y) \in [0.5,1]$ so $x+y \in [1,2]$. Now we replace y by $Y=[0.5,2]$ and obtain the bound [−1,1.5] on X. Intersecting this interval with the given bound $X=[1,2]$ on x, we obtain the new bound $X'=[1,1.5]$.

We can use X' to get a new bound on h; but his may require extensive computing if h is a complicated function; so suppose we do not. Suppose that we do, however, use this bound on our intermediate result $x+y=[1,2]$. Solving for y as [1,2]−X', we obtain the bound [−0.5,1]. Intersecting this interval with Y, we obtain the new bound $Y'=[0.5,1]$ on y. Thus, we improve the bounds on both x and y by solving for a single term of f.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-readable storage medium storing instructions that when executed by a computer cause the computer to perform a method for using a computer system to solve a nonlinear equation by using interval arithmetic, the method comprising:

receiving a representation of the nonlinear equation $f(x)=0$ within the computer system;

receiving a representation of an initial interval, X, within the computer system, wherein the representation includes a first floating-point number, $X_L$, for the left endpoint of X, and a second floating-point number, $X_U$, for the right endpoint of X;

symbolically manipulating the nonlinear equation $f(x)=0$ within the computer system to solve for a first term, $g_1(x)$, thereby producing a modified equation $g_1(x)=h_1(x)$, wherein the first term $g_1(x)$ can be analytically inverted to produce an inverse function $g_1^{-1}(x)$;

plugging the initial interval X into the modified equation to produce the equation $g_1(X')=h_1(X)$;

solving for $X'=g_1^{-1}[h_1(X)]$; and intersecting X' with the initial interval X to produce a new interval $X^+$;

wherein the new interval $X^+$ contains all solutions of the equation $f(x)=0$ within the initial interval X, and wherein the size of the new interval $X^+$ is less than or equal to the size of the initial interval X.

2. The computer-readable storage medium of claim 1, wherein the method further comprises:

setting $X=X^+$; and repeating the process of symbolically manipulating, plugging, solving and intersecting to produce a new interval $X^+$ for a second term $g_2(x)=h_2(x)$, wherein the second term $g_2(x)$ can be analytically inverted to produce an inverse function $g_2^{-1}$.

3. The computer-readable storage medium of claim 1, wherein for each term, $g_1(x)$, that can be analytically inverted within the equation $f(x)=0$, the method further comprises:

setting $X=X^+$; and repeating the process of symbolically manipulating, plugging, solving and intersecting to produce a new interval $X^+$.

4. The computer-readable storage medium of claim 1, wherein the method further comprises performing an interval Newton step on the function $f(x)=0$ and the initial interval X to narrow the set of interval solutions to the equation $f(x)=0$.

5. The computer-readable storage medium of claim 1, wherein symbolically manipulating the nonlinear equation $f(x)=0$ involves first selecting the invertible term, $g_1(x)$, as the term that dominates the function $f(x)=0$ within the interval X.

6. The computer-readable storage medium of claim 1, wherein receiving the representation of the nonlinear equation $f(x)=0$ involves symbolically manipulating an inequality to produce the nonlinear equation $f(x)=0$.

7. The computer-readable storage medium of claim 1, wherein the method is performed as part of an optimization process.

\* \* \* \* \*